United States Patent [19]

Sattin

[11] 4,110,738
[45] Aug. 29, 1978

[54] ANTI-THEFT ALARM WITH CODED RADIO LINK

[75] Inventor: Leone Glicerio Sattin, Rome, Italy

[73] Assignee: Voxon S.p.A., Italy

[21] Appl. No.: 757,126

[22] Filed: Jan. 5, 1977

[30] Foreign Application Priority Data

Jan. 13, 1976 [IT] Italy .................................. 47623/76

[51] Int. Cl.² .............................................. G08B 13/00
[52] U.S. Cl. .................................... 340/539; 340/63; 340/166 R
[58] Field of Search ............... 340/224, 63, 64, 164 R, 340/168 CC, 167 R, 166 R; 325/143, 311, 345

[56] References Cited

U.S. PATENT DOCUMENTS

| | | | |
|---|---|---|---|
| 3,047,843 | 7/1962 | Katz et al. ........................ | 340/167 R |
| 3,230,355 | 1/1966 | Chu .................................. | 340/164 R |
| 3,257,653 | 6/1966 | McCorkindale .................... | 340/224 |
| 3,513,466 | 5/1970 | Isaacs et al. ............................. | 340/63 |
| 3,646,515 | 2/1972 | Vodehnal ................................. | 340/64 |
| 3,703,714 | 11/1972 | Andrews ................................. | 340/63 |
| 3,902,075 | 8/1975 | Oros ....................................... | 340/64 |

Primary Examiner—Glen R. Swann, III
Attorney, Agent, or Firm—Beveridge, De Grandi, Kline & Lunsford

[57] ABSTRACT

At a protected site, intrusion sensors are connected to a radio transmitter which signals a remote receiver. In the transmitter, a code matrix is scanned in response to signals from a clock pulse generator to produce a coded pulse sequence. The receiver has a matching matrix arrangement to render it responsive only to the particular pulse sequence of its associated transmitter. When the system is not in use, the receiver is stored in a container arranged to automatically deactivate the system when the receiver is present and automatically activate the system when the receiver is removed.

7 Claims, 13 Drawing Figures

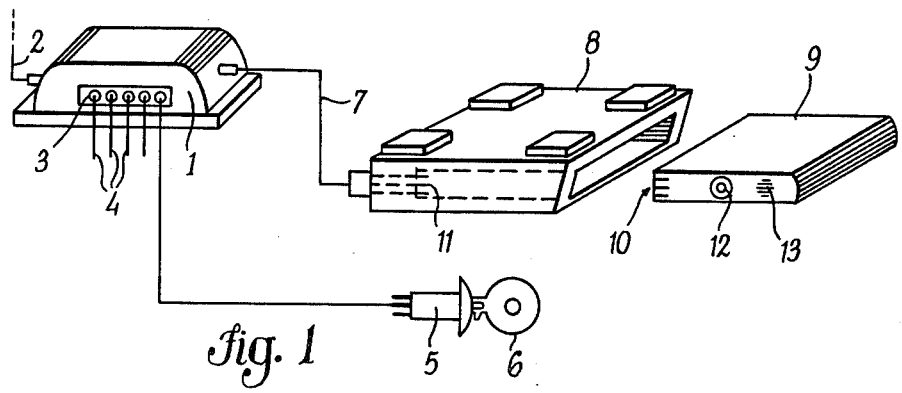
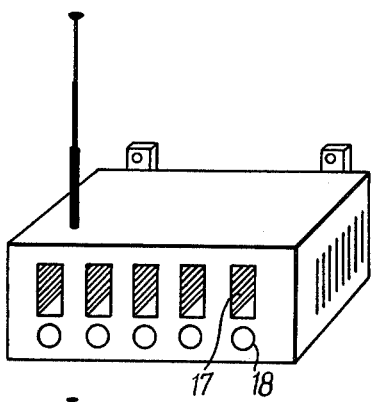
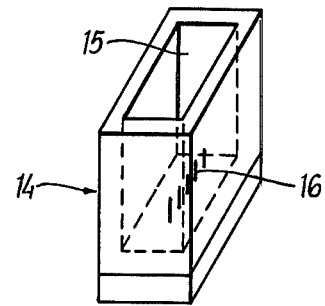
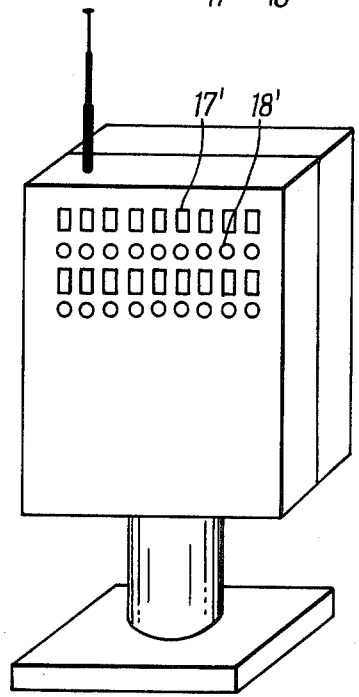
Fig. 1
Fig. 2B
Fig. 2A
Fig. 2c

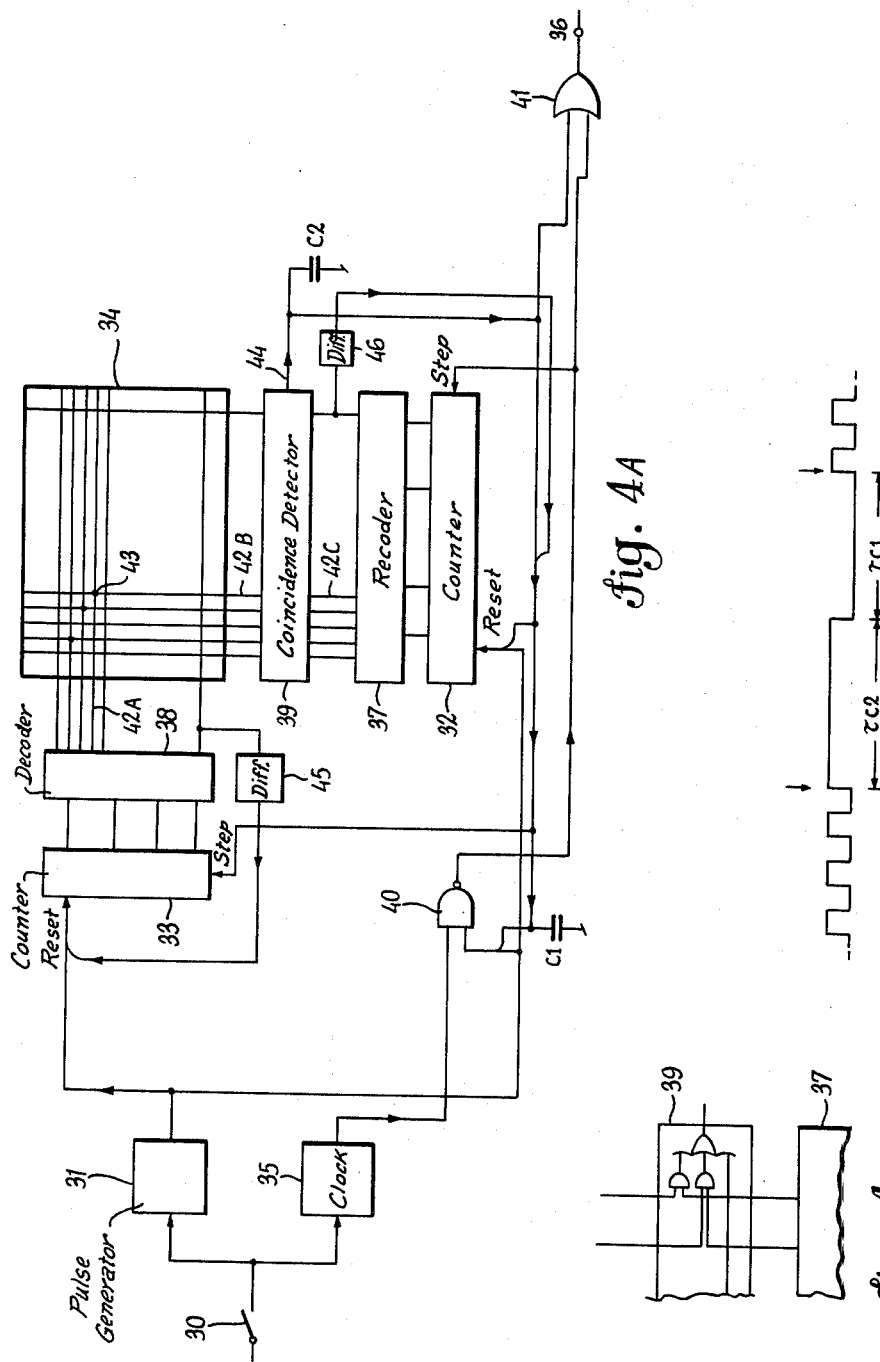

ANTI-THEFT ALARM WITH CODED RADIO LINK

BACKGROUND OF THE INVENTION

The present invention relates to a remote signalling apparatus particularly suitable for anti-theft and anti-burglary protection.

The problem of producing an alarm signal when criminal events occur, such as attempts of house-breaking against stationary elements such as windows and doors, or felonies against movable elements, such as motor cars, transportation means, boats and the like, has long been under consideration. The basic general notion exists that the protection of the property against thefts or damages is useful only if the burglary or damage attempts are detected at their beginning, so that opposing action can be carried out in useful time and with adequate means. Subsequent intervention have a useful effect too, as is now widely recognized.

SUMMARY OF THE INVENTION

It is felt that the best solution is that of transmitting an alarm signal when the criminal action is beginning, and having the signal immediately perceived by the people charged with the protection of the property, so as to allow intervention by them in useful time.

A typical case, cited by way of non limitative example, is that of movable means left unguarded, for the protection of which very numerous devices exist, generally based on mechanical protection, such as anti-theft devices, brake locks, breaking of electric circuits, etc. These devices generally are capable at the utmost of delaying the criminal action, but are unable to stop said action. Other electric devices, such as acoustic signalling devices, tend to attract the occasional attention of nearby people who seldom intervene to impede the criminal action, so that the effectiveness of such devices is nearly always not adequate.

According to the present invention it is possible to obtain several advantages over the known art, as means are provided for obtaining, preferably simultaneously, the various function of delaying the criminal action and of transmitting a remote alarm signal directly to the people who, even if in a remote location, serve the function of defending the property, and also to the police.

BRIEF DESCRIPTION OF THE DRAWINGS

The system according to the present invention will be now described with reference to certain embodiments thereof at present preferred, and disclosed by way of non limitative example, and with reference to the attached drawings wherein:

FIG. 1 diagrammatically shows the general arrangement of the active part of the system with respect to the protected zone;

FIGS. 2A, 2B and 2C show three typical examples of the passive or utilization part of the system;

FIG. 4A shows a detailed block diagram corresponding to the diagram of FIG. 3;

FIG. 4B is a logical block diagram of one component of the unit of FIG. 4A;

FIG. 4C depicts a typical output waveform from the unit of FIG. 4A,

DESCRIPTION OF A PREFERRED EMBODIMENT

Figure 3:
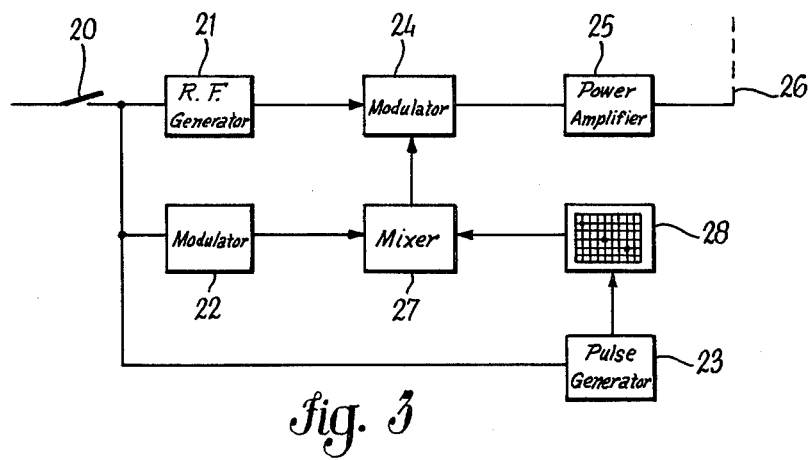
FIG. 3 shows the general block diagram of the signal transmitting unit according to this invention.

Let us refer to FIGS 1 and 2.

In the "protected zone" a room, a group of rooms, a motor car, a boat, a barrier, there is located an emitter of remotely detectable signals such as a radio transmitter 1 to which is associated a radiating element 2 such as an antenna. The radio transmitter 1 can be connected by a connector 3 and conductors 4 to anti-theft or alarm sensors of a well known type, such as magnetically controlled switches, mechanical contacts for windows and doors, accelerometers, ultra-sound or microwave room sensors and the like.

Suitably, a switch 5 controlled by a key 6 permits, in a known way, activation of selected portions of the system and/or carrying out tests.

The radio-transmitter 1 is also connected through the conductors 7 to a support or container 8 arranged to receive in a removable way a portable receiver 9 provided with a connector 10 which can be inserted on a corresponding connection 11 in the container 8. The portable receiver is equipped with an antenna 12 and an acoustic warning device 13.

The general operation of the system is as follows. After the necessary tests have been carried out, and/or the desired portions of the system activated by the key 6, before leaving the room or the vehicle where the system is mounted the receiver 9 is removed, rendering operative the system. In case of signal or alarm intervention, the receiver 9 with the acoustic signalling device 13 warns the responsible party.

Apart from the "individual" use of the receiver 9, this can be associated to a passive system as shown by way of example in FIGS. 2A, 2B, 2C. This passive system comprises a case 14 (FIG. 2A) having a recess 15 within which the receiver 9 can be inserted, said recess being provided with a connector 16 which engages the connector 10 of the receiver 9 for operating the possible servocontrols or alarms.

FIGS. 2B and 2C show two multiple systems respectively, i.e. capable of receiving a multiplicity of receivers 9, each comprising a multiplicity of recesses 17, 17' associated for instance to warning devices 18, 18'.

Let us refer, now, to FIG. 3 showing the general block diagram of the signal transmitting unit denoted by 1 in FIG. 1.

This unit is preferably arranged so as to effect a continuous radio frequency transmission including a modulating frequency controlled by a coding device personalized for each unit, so as to allow the receiving device to discriminate (a) the carrier frequency, (b) the modulating frequency, and (c) the code by which the modulating frequency is imparted to the carrier frequency.

If and when these three characteristics (a, b, c,) coincide in the manner preset in the receiver 9, the latter becomes capable of supplying the desired signal or alarm. When the general enabling contact 20 is closed, the elements 21, 22, 23 are energized, said elements consisting of a radiofrequency generator 21, a modulating frequency generator 22 and a coding pulse generator 23, respectively.

The radiofrequency signal from generator 21 reaches the modulator 24 wherefrom it is sent to the power amplifier 25, the load of which is an antenna 26. The modulating signal for the modulator 24 is supplied by the multiplier or mixer 27 to which are applied the continuous modulating signal supplied by the generator 22 and a sequence of pulses which continues according to the program recorded in the coding matrix 28, as it will be better described later on.

The physical structure and the operation of the elements 21, 22, 24, 25, 26, 27 are well known to a person skilled in the art and they will not be examined in their details. The operation of the elements 23, 28, which constitute a specific unit characteristic of the present invention, will now be described with reference to FIG. 4A.

With reference to this figure, the enabling contact 30 (analogous to the contact 20 of FIG. 3) controls a monostable or other pulse generator 31, giving an initial clear pulse to the counters 32, 33 which control the line and column scanning of the matrix 34, respectively. Simultaneously, the clock oscillator 35 starts, to supply a set of square wave pulses which are presented at the output 36 in trains determined by the programming on the matrix 34.

Each of the counters 32 and 33 drives a decoding matrix 37, 38, respectively, in a known way in order to supply line and column scanning pulses to the matrix 34. Between the decoding matrix 37 and the column wires of the matrix 34 is interposed the coincidence detecting circuit 39 shown by way of example in FIG. 4B.

The train of pulses coming from the oscillator 35 and passing through the NAND gate 40 reaches the input of the counter 32 and passes through OR gate 41 to the output 36. Assume that the counter 33 is at the appropriate count such that line 42A of the matrix 34 is energized. Through the program interconnection 43, the energization is transferred to the column 42B; when the counter 32, energizes the output conductor 42C of the decoding matrix 37, the unit 39 perceives the coincidence and supplies an output on conductor 44. The output signal on conductor 44 reaches the reset input of the counter 32 and the stepping input of the counter 33 which shifts to the subsequent line.

Thus at the output 36 a number of steps is obtained equal to the number of steps made by the decoder 37 as it is driven by the counter 32. The same occurs for the next line after the considered one.

When the counter 33 causes scanning of the last line, the signal appearing on the last line through the differentiating device 45 causes the counter 33 to be re-set, whereby the described process starts again.

In case an interconnection between one line and a column of the matrix 34 is absent, the energization signal presenting on the last line of the decoding matrix 37 through the differentiating device 46 re-sets the counter 32 and supplies a stepping pulse to the counter 33.

Thus the operation of the system as described is repetitive and continuative and stops only when the contact 30 is open.

FIG. 4C shows a typical form of output wave indicating the characteristic moments of coincidence, end of count, wait, count resuming. As shown, the two wait times are given, for instance, by the capacitors C1 and C2, but also other means are possible in a known way.

As far as the matrix denoted in 34 in FIG. 4A is concerned, in one embodiment at present preferred of the present invention, said matrix is embodied as it will be described with reference to FIGS. 6A, 6B, 6C. The FIG. 6A shows a portion of the matrix; the FIG. 6B shows a sectional view taken along the plane of line VI B of FIG. 6A and the FIG. 6C shows on a very enlarged scale one of the line-column crossing points of the considered matrix.

Figure 6A:
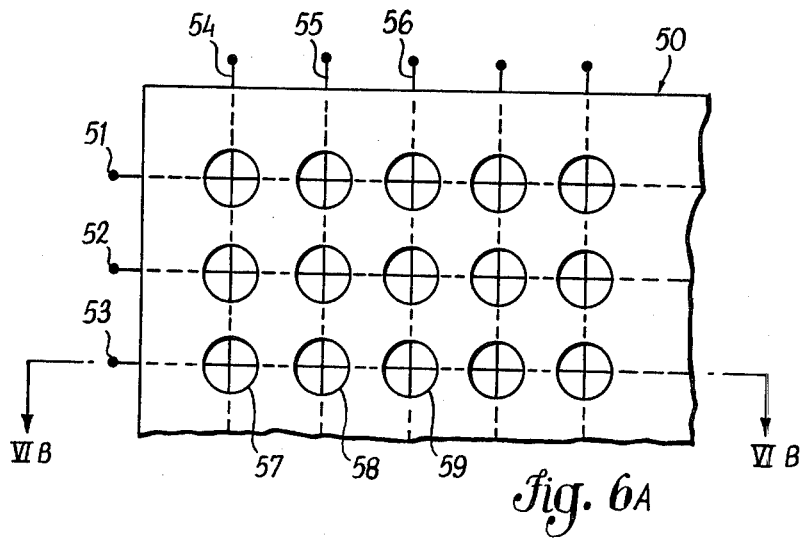
FIGS. 6A, 6B and 6C show in detail one possible structure according to this invention.
Figure 6B:
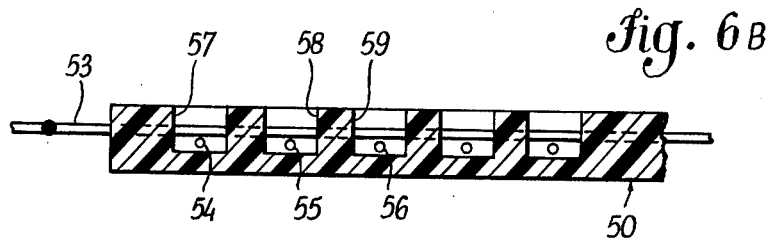
Figure 6C:
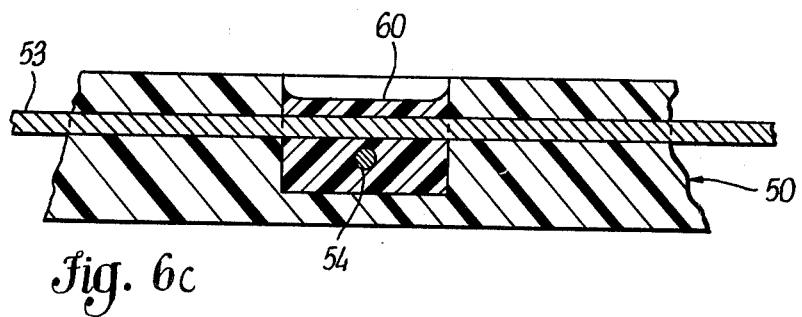

As shown in FIG. 6A, the matrix comprises a physical support 50 of insulating material in which are embedded two arrays of line conductors 51, 52, 53 . . . and column conductors 54, 55, 56 . . . spaced apart from one another so as to remain insulated from one another.

In correspondence with the crossing points of the line conductors and column conductors are provided the holes 57, 58, 59 . . ., preferably blind holes, in which it is possible to cast, or not, one of the known conductive synthetic resins (epoxy resins with fillers of metal powders or graphite) so as to establish at crossing points pre-selected according to the code to be formed, a low resistance path (practically a short-circuit for the logic signal). This is better shown in FIG. 6C where the conductive resin 60 is shown to form a conductive path between the line 53 and the column 54.

Of course the connections might be effected by soldering or by mechanical elements. It is preferred to indicate the possibility or the advisability of using a conductive resin, as it is possible to provide blank programming cards with precut holes or the like in order to allow the code programming to be simplified and rendered economical and capable of being made "in the field".

Figure 7:
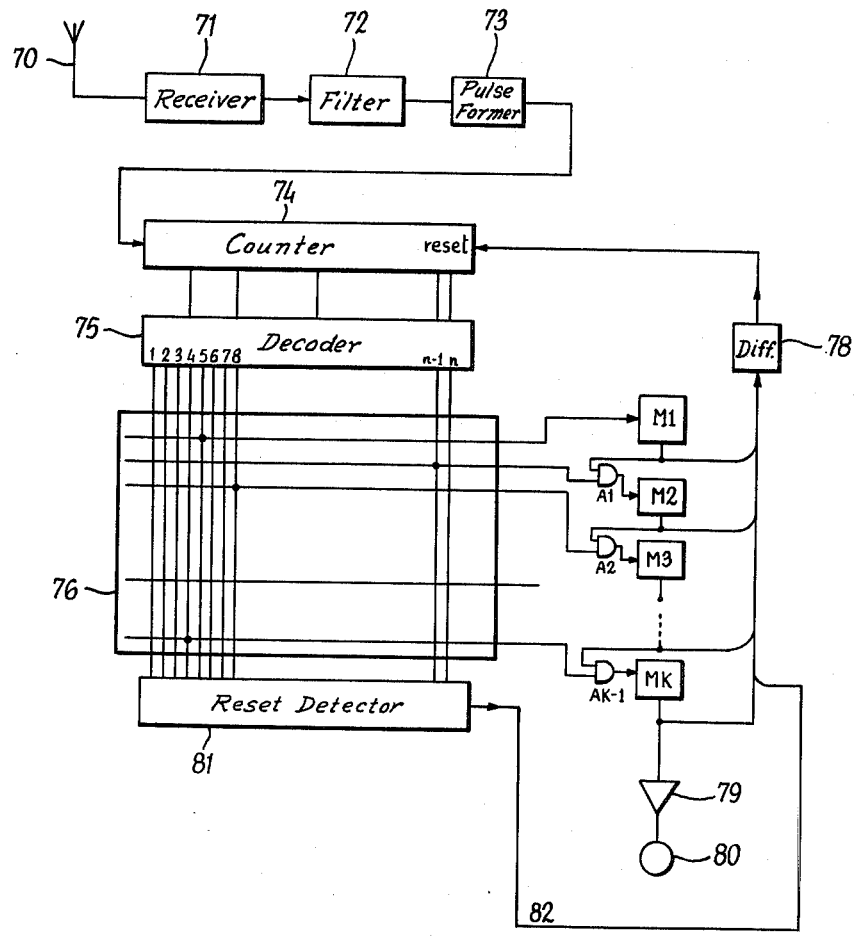
FIG. 7 shows the block diagram of the signal detecting unit of the system according to this invention.

Now, with reference to FIG. 7 a preferred embodiment of the portable signal detecting unit for the system according to the present invention, will be described.

An antenna 70 picks up the signal transmitted by the transmitter as previously described, and this signal will be sent to a conventional receiver 71 having a stability sufficiently high for remaining tuned with the transmitter to which it is associated. At the output from the receiver 71, optionally a band-pass 72 filter is located to pass the modulating frequency (as produced by the generator 22 of FIG. 3). The output from the filter 72 is applied to a conventional pulse forming device 73 transforming the signals into logical levels suitable to drive the counter 74.

The counter 74 is associated in a known way with a decoder 75 which drives sequentially the columns of the matrix 76 (analogous to the matrix 34 of FIG. 4A.)

As aforesaid, the signal transmitted by the transmitter consists of a sequence of pulse trains wherein the number of pulses in each train is established by the coding programmed in the matrix 34.

It will be seen that this allows the self-synchronizing of the receiver on the signal for which it is programmed, rejecting those signals or noises which could generate false alarms.

Let us suppose for clearness of disclosure that the counter 74 is re-set, and that the correct sequence of trains of pulses will start arriving. The train of pulses include, for instance:

5

$n - 1$

8

...

4 pulses.

Therefore, at the fifth pulse, the fifth column of the matrix 76 is energized. As shown there is a connection of the fifth column to the first line of the matrix. Thus the memory M1 is energized. This causes the reset of the counter 74 through the differentiating device 78 and enables the AND gate A1. The next subsequent pulse contains $n-1$ pulses. At the $n-1$th step the memory M2 is energized, with the same result as with the memory M1.

At the end of the sequence, a four pulse train arrives. The gate AK-1 had been previously energized so that the memory MK is enabled, and this memory through the buffer 79 energizes the signalling device 80 (contacts, lights, buzzers, etc.).

Let us assume, now, that a non correct, sequence of pulses arrives. It will be remembered that each train is separated from the next subsequent train by a sharply precise time interval (FIG. 4C).

This means that the counting of the counter 74, and therefore the progress of the decoder 75, and thus the duration of energizing of a column undergoes a conditioning action.

Let us assume, for instance, that a train consisting of three pulses arrives. The column 3 remains energized through a certain time greater than the clock time (FIG. 4C). This is detected by known means by the circuit 81 which sends a signal for re-setting the counter 74.

Let us assume that a train consisting of six pulses arrives (the first line is programmed for 5 pulses). The memory M1 is energized and the counter is re-set through the M1 and 82 ways. The gate A1 is enabled. There present now, for instance, six pulses (the second line is programmed for 8 pulses). The count will stop at the column 6 and the counter 74 will be re-set. The memory M2 will be not energized.

Consequently, continuous re-sets are obtained for the counter 74 and it is impossible to continue the energization of the memories up to the memory MK.

Suitably, the memories M1, M2 . . . MK can be of a "volatile" type, i.e. having a memorization capacity not greater than the time of two or three sequences of pulse trains, in order to avoid that a particular combination of errors can arrive, in the necessary time, to saturate the chain M1 . . . MK and operate the alarm.

Figure 5:
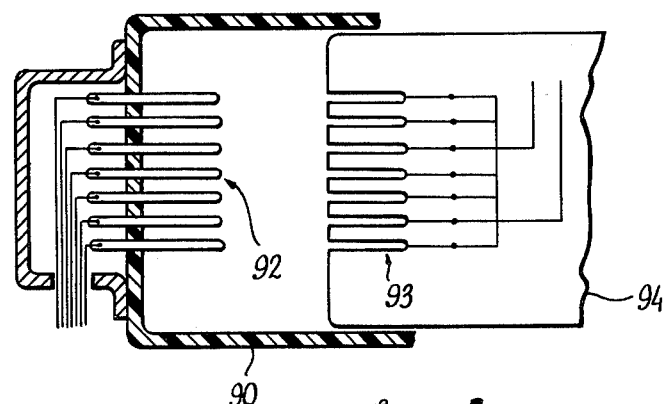
FIG. 5 diagrammatically shows a detail of the system.

FIG. 5 shows a detail concerned with the receiving unit 9 in FIG. 1. With reference to said FIG. 5, the support or container 90 (corresponding to the support or container 8 of FIG. 1) is provided with a connector 92 pre-disposed for inserting into the seat 93 of the receiver 94. Suitably, the number of elements of electric connection of the connector 92 and of the seat 93, is far greater than the number of the operative connections for the receiver 94. The surplus of electric connection can be used to supply an electric "key" coded by several redundant connections operating in a known way either on the continuity of a vital electric circuitry for the unit to be protected, for instance the ignition circuit in case of a motor car, or on additive signalling elements so as to prevent the system from being cheated by a non authorized person, however having at his disposal any receiving unit of the related type. Of course, besides the coded interconnections it is possible to plan a known type mechanical coding.

It is possible to devise several variations and/or expanded embodiments of the system according to the present invention, without departing from the technical teaching as previously disclosed.

For instance the motor cars of the police could be provided with receivers permanently tuned on the signalling frequency. Also, in a city it could be possible to plan a net of receivers connected to a centralized station in order to follow the movements of a motor car driven by a non authorized person.

Having thus described the present invention, what is claimed is:

1. A remote signalling system for indicating unauthorized access to a protected area comprising:

A transmitting unit adapted for stationary location at the protected area and including a clock signal generator; first code matrix means connected to said clock signal generator and adapted to be programmed according to a predetermined code and responsive to clock signals from said clock signal generator for supplying a pulse signal sequence indicative of the predetermined code; a radio transmitter connected to said first code matrix means for transmitting radio signals of the pulse signal sequence; and activating means responsive to unauthorized access to the protected area for activating said clock signal generator; and a receiving unit including a radio receiver for receiving radio signals transmitted by said radio transmitter; and second code matrix means connected to said radio receiver and adapted to be programmed according to the same predetermined code and responsive to receipt of radio signals of the pulse signal sequence for generating an alarm indication.

2. A system as claimed in claim 1 in which each of said first code matrix means and said second code matrix means comprises a plurality of line conductors; a plurality of column conductors intersecting said plurality of line conductors; means for connecting selected ones of said line conductors to selected ones of said column conductors at intersections thereof in accordance with the predetermined code; and scanning means for sequentially scanning said line conductors and said column conductors for transmitting pulses in accordance with the connected intersections in said transmitting unit and for receiving pulses in accordance with the connected intersections in said receiving unit.

3. A system as claimed in claim 2 in which said second code matrix means includes a counter for counting pulses of the received pulse signal sequence and for sequentially activating said second code matrix means column conductors in response to counted pulses.

4. A system as claimed in claim 3 in which said second code matrix means includes memory means responsive to activation of a preselected sequence of said column conductors to generate the alarm signal, the preselected sequence corresponding to the predetermined code.

5. A system as claimed in claim 1 in which said receiving unit includes connector means for activating said receiving unit and having a number of operative connection contacts and a number of redundant connection contacts, said redundant connection contacts being interconnected through said connector means to form a safety electric key for said receiving unit.

6. A system as claimed in claim 1 in which said receiving unit includes filter means for selectively passing predetermined frequency signals and in which said transmitting unit includes means for generating the predetermined frequency signals as a part of the transmitted pulse signal sequence radio signal.

7. A system as claimed in claim 1 in which said transmitting unit activating means comprises a plurality of sensors for sensing various unauthorized access indications, and switch means permitting selected disabling of individual ones of said sensors.

* * * * *